March 20, 1928.

J. E. McLAUGHLIN

1,662,861

GLASS FORMING APPARATUS

Filed Aug. 30, 1926

INVENTOR
John E. McLaughlin
BY
J. F. Rule.
HIS ATTORNEY

March 20, 1928.

J. E. McLAUGHLIN

GLASS FORMING APPARATUS

Filed Aug. 30, 1926

INVENTOR
John E. McLaughlin
BY
J. F. Rule.
HIS ATTORNEY

Patented Mar. 20, 1928.

1,662,861

UNITED STATES PATENT OFFICE.

JOHN E. McLAUGHLIN, OF TOLEDO, OHIO, ASSIGNOR TO THE OWENS BOTTLE COMPANY, OF TOLEDO, OHIO, A CORPORATION OF OHIO.

GLASS-FORMING APPARATUS.

Application filed August 30, 1926. Serial No. 132,359.

My invention relates to improvements in glass forming apparatus and particularly to means whereby the finish and neck molds may be adjusted from time to time to maintain accurate alignment of the neck and finish mold cavities and thereby prevent the formation of offset neck portions in the ware being produced.

In machines in use at the present day, there is frequently disalignment of the neck and finish mold cavities and consequent offsetting of the neck portions of bottles or other ware produced therein, on account of which considerable difficulty is experienced in capping such bottles or the like ware. This is particularly true where bottles are being capped by an automatic machine, it being understood that where the neck portion is offset, the cap engaging portion of the machine will be off center and fail to affix caps to such deformed bottles. Also, the offset necks detract considerably from the appearance of the ware.

An object of the present invention is to eliminate the above objectionable condition by providing readily accessible means whereby an operator may adjust the finish mold hinge pin plate to accurately align the axes of the finish and neck mold cavities.

Another object is to provide independent means allowing adjustment of the finish mold hinge pin plate radially toward or away from the axis of the machine; tangentially of the finish mold path of travel; or circumferentially around the axis of the finish mold carrier shoe.

Other objects will be apparent hereinafter.

In the accompanying drawings:

Figure 13 shows the front cavity of a double cavity finish mold offset to one side of the normal center line.

Figure 14 shows the relation of the two cavities after slight rotation of hinge pin plate about its vertical axis, the result being that both cavities are offset one-half of the extent to which the first cavity was offset.

Figure 15 shows the mold cavities properly aligned as a result of lateral or tangential shifting of the hinge pin plate with the finish mold.

Figure 1:
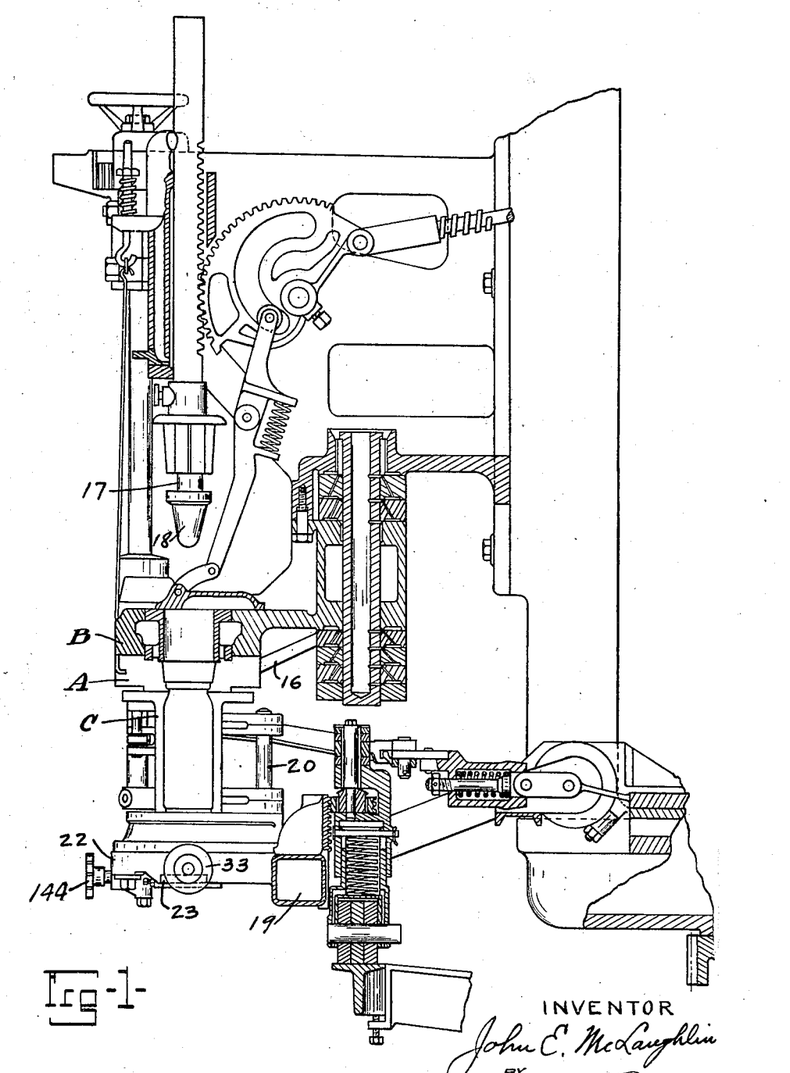
Figure 1 is a part sectional elevation showing my invention as applied to an Owens vacuum type machine.

The present invention is herein shown adapted to an Owens automatic bottle blowing machine such as that illustrated and described, for example, in the United States Patent to La France, Number 1,185,687, dated June 6, 1916. This machine includes a number of heads or units each comprising a neck mold "A", a blank mold (not shown), and a finishing mold "C". The neck mold comprises horizontally separable sections carried on arms 16 by which said sections are supported directly beneath a blow head "B". The finish molds "C" are formed with either a single cavity (Fig. 1) or a plurality of cavities (Fig. 5) intended to be periodically aligned with corresponding cavities in the neck mold.

In operating a machine of the type above referred to, the head "B" is lowered to bring the blank mold (not shown) into contact with the supply of molten glass, and the glass is drawn into said mold to form a parison or parisons. The blank mold sections are then separated, leaving the parison or parisons suspended from the neck mold. The finish mold sections are then raised by means of the usual cam mechanism and brought into engagement with the neck mold "A", enclosing the parison or parisons suspended from said neck mold. The plunger 17 is also lifted, withdrawing the core 18 from the neck mold, leaving the parisons in condition to be blown to finished form as is customary.

Each finish mold comprises separable sections supported and periodically brought into engagement with each other, in the usual or any preferred manner. These finish mold sections are fulcrumed to a vertical hinge pin 20 whose lower end is set into a socket formed in a hinge pin plate 21.

My invention comprises means, through manipulation of which, finish mold cavities and corresponding neck mold cavities may be accurately aligned, one form of said means comprising the structure hereinafter set forth.

Figure 2:
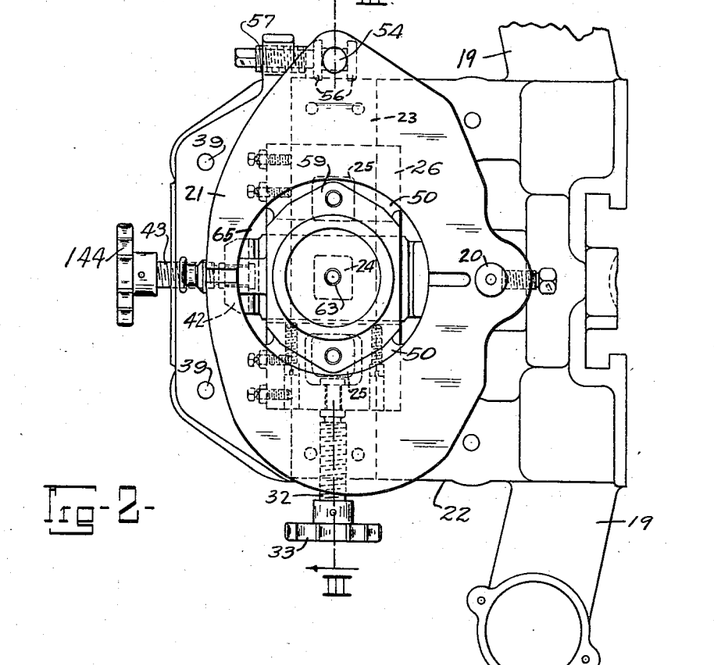
Figure 2 is a fragmentary top plan view of a finish mold carrier constructed in accordance with my invention.
Figure 3:
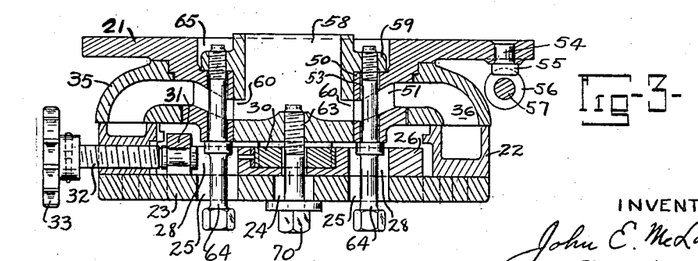
Figure 3 is a sectional view taken substantially on the line III—III of Figure 2.
Figures 9, 10:
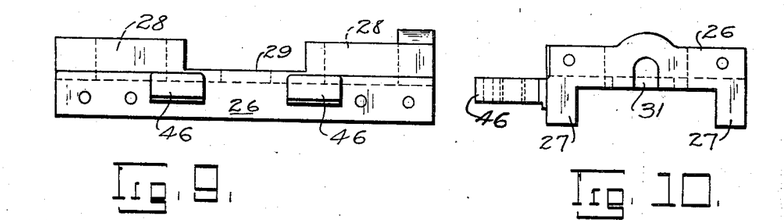
Figures 9 and 10 are side and end elevations, respectively, of the hinge pin holder cross slide.

The mold carrier shoe 22 is of substantially the type ordinarily used in vacuum machines and includes an open frame, the end and rear portions of which are partly of hollow form. Air supply pipes 19 communicate with the hollow portions of the shoe frame providing means for cooling the finish mold bottom plate and adjacent portions of the finishing mold, as will be hereinafter apparent. A guide bar 23 is bolted or otherwise fixed to the lower side of the mold carrier shoe 22, as is seen in Figures 2 and 3. This guide bar extends longitudinally of the shoe and tangentially of the path of travel of the mold and is formed with a central vertical opening 24 and a pair of additional openings 25 at opposite sides of said central opening. A slide 26 straddles and rests on the upper face of the guide bar 23. This slide is formed with parallel, spaced, depending flanges 27 (Fig. 10) which engage the opposed vertical sides of said guide bar 23. The slide 26 is of less length than the distance between the inner faces of the end arms of the mold shoe 22 as shown in Figure 3, thereby providing for adjustment of the slide longitudinally of the guide bar 23. The slide 26 is provided with a pair of longitudinally spaced vertical openings 28 which may be vertically aligned with the openings 25 spaced from the central opening 24 in the guide bar 23, bolted to the mold carrier shoe. An upwardly opening channel 29 of rectangular cross section extends transversely of the upper side of the slide 26 to accommodate a cross bar 30 integrally formed with a hinge pin plate holder to be described. One end of the slide 26 is enlarged and provided with an upstanding arch 31 which provides means whereby swivel connection may be had with an adjusting screw 32. This adjusting screw 32 is threaded through an opening in one end of the mold carrier shoe 22 and is provided with a hand wheel 33. Rotation of the hand wheel causes the slide 26 to move longitudinally upon the guide bar 23, as is apparent in Figure 3. The vertical openings in the guide and slide bars 23 and 26, respectively, are of such diameter that ample longitudinal movement of the securing bolts extending therethrough, is allowed to permit effective relative adjustment of the several parts.

Figure 4:
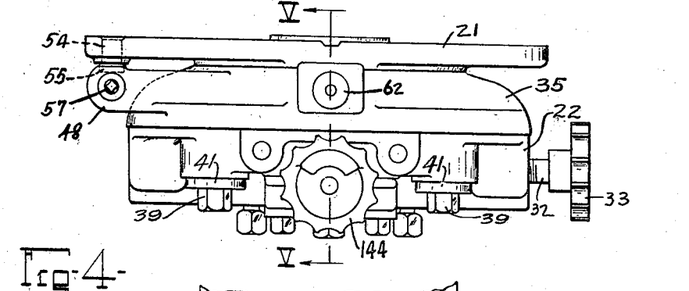
Figure 4 is a front elevation of the assembly shown in Figure 2.
Figure 5:
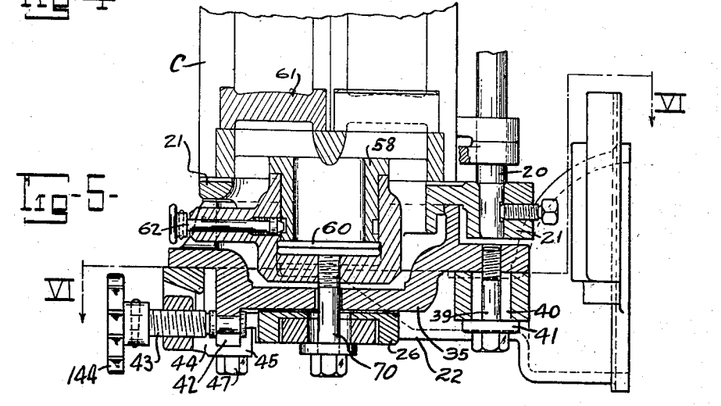
Figure 5 is a part sectional elevation taken transversely of the finish mold carrier along the line V—V of Figure 4 and showing a construction adapted for use with multiple cavity molds.
Figure 6:
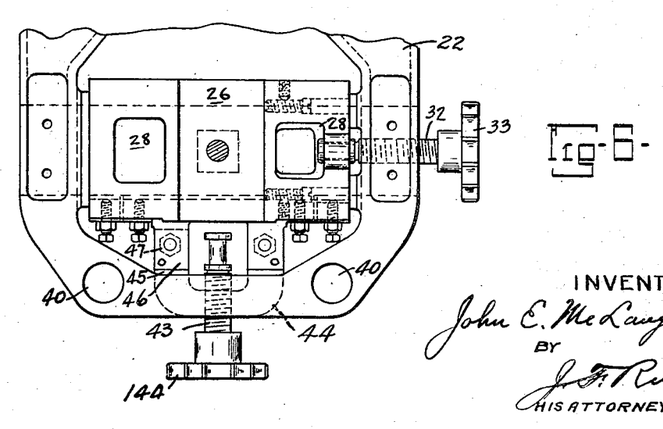
Figure 6 is a view taken substantially on line VI—VI of Figure 5.
Figure 7:
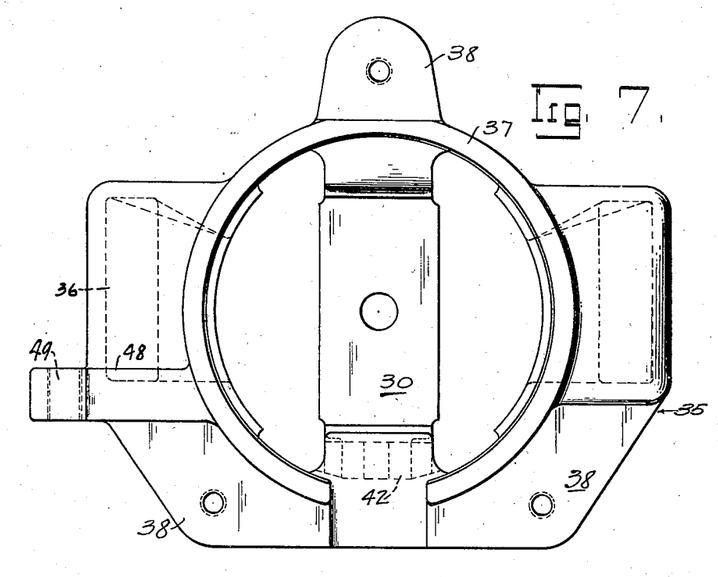
Figure 7 is a plan view of the hinge pin holder base.
Figure 8:
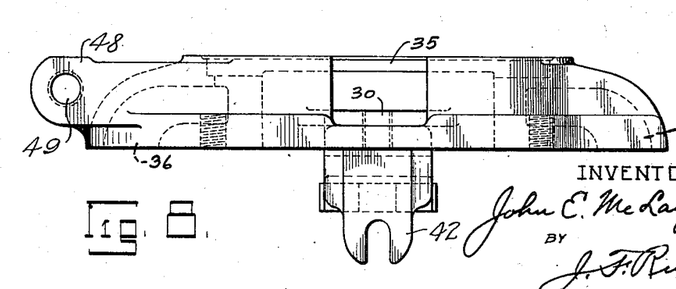
Figure 8 is a front elevation of said base.

A hinge pin plate holder 35 (see Figs. 7 and 8) is arranged upon the mold carrier shoe 22 and is provided with opposed ports 36 which register with outlets from the hollow portions of the mold carrier shoe 22. This holder comprises a casting including an annular bearing 37 whose lower side is spanned by the integral transverse guide bar 30 which, as heretofore pointed out, is arranged in the transverse channel 29 of the slide 26. This holder is also provided with horizontal ears 38 having openings adapted for threaded engagement with locking bolts 39. These bolts 39 extend through openings 40 in the front and rear portions of the mold carrier shoe, said openings 40 being of considerably greater diameter than the bolts and permitting lateral movement of said bolts in the openings. In Figures 4 and 5, it will be noted that two of these bolts are located at the outer side of the shoe 22 and one at the inner side. Washers 41 are arranged between the bolt heads and mold carrier shoe for an obvious purpose. At one end of the cross bar 30, a depending furcated ear 42 is formed, providing means permitting connection between the hinge pin plate holder 35 and an adjusting screw 43 which is threaded in a holder or bracket 44 shown in Figures 5 and 6. This adjusting screw 43 is equipped with a hand wheel 144, by means of which said screw is rotated. The screw carrying bracket 44 is provided with a pair of ears 45 which are separably attached by means of bolts 47 to longitudinally spaced forwardly extending ears 46 on the aforementioned slide bar 26. Rotation of this screw 43 moves the hinge pin plate holder 35 transversely of the slide 26 toward and from the center of the forming machine, independent of any other adjustment. One end of the holder 35 is formed with a longitudinally extending ear 48 having a transverse threaded opening 49 whose function will be hereinafter apparent.

Figure 11:
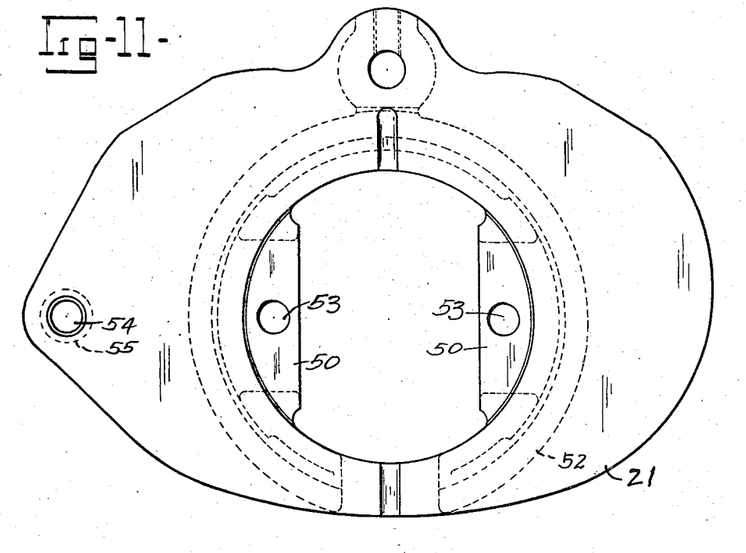
Figures 11 and 12 are top plan and front elevations, respectively, of the hinge pin plate.
Figure 12:
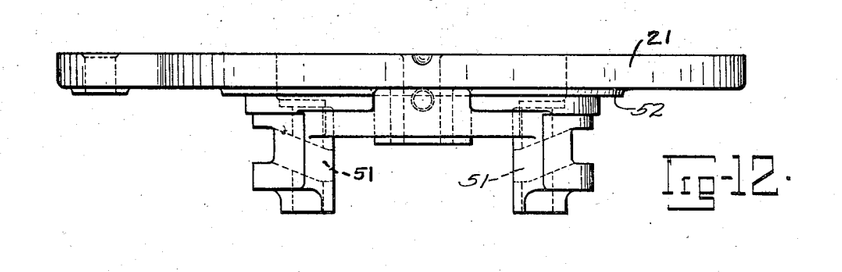

The hinge pin plate 21 is of substantially elliptical form and carries a readily removable vertical hinge pin 20 as heretofore pointed out. A relatively large central opening 65 is formed through said hinge pin plate, from which depends a pair of diametrically opposed bosses 50 whose outer faces form bearing surfaces engaging the inner face of the bearing 37 of the plate holder 35. These bosses are also formed with radial openings 51 communicating with the air ports 36 of said plate holder. Substantially at the juncture of the bosses 50 and the hinge pin plate 21, bearing shoulders 52 are formed and adapted to rest upon the bearing 37 of the holder 35. These bosses are also formed with vertical openings 53 through which finish mold bottom plate holding bolts extend. One end of the hinge pin plate 21 is formed with a vertical opening in which is fixed a shank 54 carrying a head 55. This head is located between a pair of longitudinally spaced annular shoulders 56 formed upon a transverse adjusting screw 57 threaded in an opening 49 in the ear 48 above referred to. The other end of this adjusting screw 57 is formed for engagement with a socket wrench, though obviously other means may be employed for rotating said screw. It is evident that rotation of this screw 57 rotates the hinge pin plate with respect to its holder and the mold carrier shoe.

The bottom plate holder 58 is set into the central opening 65 in the hinge pin plate 21 and is provided with opposed ears 59 resting upon the bosses 50 of said hinge plate and formed with vertical openings in register with those in said bosses. Diametrically opposed openings 60 are formed in said bottom plate holder and register with the transverse openings 51 in said bosses 50 so that air may be admitted to the interior of said holder 58 and into contact with the finish mold bottom plate 61 and adjacent portions of the finish mold. As is customary, the bottom plate holder is provided with a releasable lock pin 62 whose inner end engages a depending portion of the holder 58. The bottom of said holder 58 is formed with a threaded opening 63 which registers with the vertically aligned central openings in the guide bar 23, slide 26 and the cross bar 30, as seen in Figure 3. A locking bolt 70 extends through said central openings and is threaded into said opening 63 in the bottom plate holder to interlock the hinge pin plate, the two holders and the shoe. Locking bolts 64 extend upwardly through the openings 25 in said guide bar 23 and through the vertical openings 53 in the bosses 50 and are threaded into openings formed in the ears 59 of said bottom plate holder. These bolts provide for rigid connection between the bottom plate holder 58 and the hinge pin plate 21 in that they draw the ears 59 of said holder and the bosses of the hinge pin plate 21 together. Because of the rigid connection between the bottom plate holder and the hinge pin plate, said holder functions as a stop for limiting inward movement of the finish mold sections. This movement on the part of the finish mold sections has heretofore been taken care of by closing of the mold against the ordinary rectangular centering pins, which are eliminated where the present invention is used.

Alignment of finish and neck mold cavities with this device may require one or several adjustments. Because of the independent means employed for rotating the hinge pin plate 21 and bottom plate holder; adjusting the hinge pin plate toward and from the axis of the forming machine; and movement of said plate tangentially of the path travelled by the mold or longitudinally of the mold carrier shoe, it is evident that whether conditions require shifting of the hinge pin plate in one or several directions, the requirements can be easily met. In the event both mold cavities are offset longitudinally of the shoe to corresponding degrees, only the adjusting screw 32 need be manipulated. Should the mold cavities be offset radially of the machine, manipulation of the adjusting screw 43 which moves the hinge pin plate toward or from the axis of the machine will correct the fault.

Figure 13:
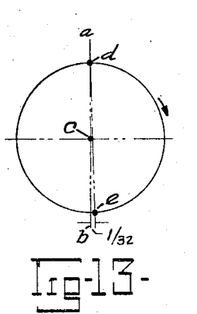
Figures 13, 14 and 15 illustrate diagrammatically the steps taken in centering multiple cavity neck and finish molds wherein the front or outer cavities of the neck and finish molds are being inaccurately interengaged.
Figure 14:
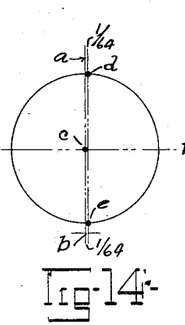
Figure 15:
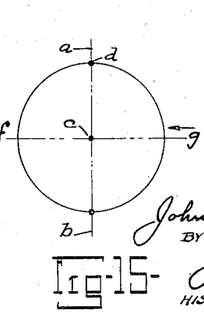

In Figures 13, 14 and 15, I have diagrammatically illustrated a condition wherein the outer of a pair of mold cavities is offset relative to the corresponding neck mold cavity, while the rear or inner cavity is properly positioned. The line $a$—$b$ running through the center or axis "$c$" designates the normal center line of the mold cavities. The rear mold cavity "$d$" is accurately aligned with its neck mold cavity while the front finish mold cavity "$e$" is offset as indicated. This condition causes a corresponding degree of offset as between the neck and body portions of ware formed in the front neck and finish mold cavities. In correcting this fault, the locking bolts 39 and the center bolt 70 are loosened, thereby freeing the hinge pin plate and bottom plate holder for rotation relative to the hinge pin plate holder 35 and the mold carrier shoe 22. The adjusting screw 57 is then rotated, causing movement of the hinge pin plate, finish mold bottom plate and finish mold sections about the vertical axis "$c$." These elements are moved sufficiently to cause corresponding degrees of offset of the two finish mold cavities with respect to the center line $a$—$b$ (see Fig. 14). This adjustment disposes the center line $a$—$b$ and an imaginary line between the two mold cavities in parallelism. Thus, the rear finish mold cavity is intentionally offset one-half the extent to which the front cavity was offset prior to initial adjustment, and the original offset of the front cavity is decreased fifty per cent. Rotation of the end adjusting screw 32 will move the hinge pin plate and finish mold bottom plate as a unit longitudinally of the mold carrier shoe and pin plate holder along the line $f$—$g$ and in the direction indicated by the arrow in Figure 15. This adjustment is continued until the imaginary line between the finish mold cavities and the center line $a$—$b$ coincide. At this point, the center locking bolt 70 is tightened to temporarily lock the several elements in fixed relation with each other for a trial run of the machine. If this trial run proves that the ware is being produced without offset neck portions, the three remaining locking bolts 39 are tightened to securely interlock the mold carrier shoe and hinge pin plate holder.

Manifestly, certain changes may be resorted to within the spirit and scope of the appended claims.

What I claim is:

1. The combination of a mold carrier shoe, a hinge pin plate spaced above said shoe, a hinge pin plate holder interposed between the plate and shoe, means separably connecting the shoe, holder and plate, and means interconnecting the holder and plate including devices to effect individual or simultaneous adjustment of the holder and plate with respect to the shoe.

2. The combination of a mold carrier shoe, a hinge pin plate spaced above the shoe, a hinge pin plate holder arranged between the shoe and plate, connection between the holder and shoe including means to effect transverse and longitudinal adjustment of the holder and plate relative to the shoe, connection between the holder and pin plate operable to effect rotary adjustment of the plate in its holder, and separable connection between the shoe, holder and plate for locking said elements in any adjusted relation.

3. The combination of a ring-like mold carrier shoe, a stationary guide bar extending across said shoe, a slide straddling said bar and movable longitudinally thereof, a hinge pin plate holder having slidable connection with said slide in a direction transversely of said guide bar, means for adjusting the holder and slide longitudinally of the guide bar, a hinge pin plate carried by said holder, and means separably interconnecting the shoe, holder and plate.

4. The combination of a ring-like mold carrier shoe, a stationary guide bar extending across said shoe, a slide straddling said bar and movable longitudinally thereof, a hinge pin plate holder having slidable connection with said slide in a direction transversely of said guide bar, means for adjusting the holder and slide longitudinally of the guide bar, a hinge pin plate carried by said holder, means for rotating said hinge pin plate and its holder as a unit, and means separably interconnecting the shoe, holder and plate.

5. The combination of a mold carrier shoe, a hinge pin plate holder, a hinge pin plate carried by said holder, connection between the holder and shoe including means to effect multi-directional angular adjustment therebetween, connection between the holder and plate operable to effect rotary adjustment of the hinge pin plate relative to the holder, and releasable means rigidly interconnecting the shoe, holder and plate.

6. The combination of a mold carrier shoe, a hinge pin plate holder, a hinge pin plate carried by said holder, connection between the holder and shoe including means to effect multi-directional angular adjustment therebetween, connection between the holder and plate operable to effect rotary adjustment of the plate relative to the holder, and a releasable bolt disposed axially of, and rigidly interconnecting the shoe, holder and plate.

7. The combination of a neck mold, a finish mold hinge pin plate, and mechanical means for rotating and laterally shifting the plate relative to the neck mold.

8. The combination of a neck mold, a finish mold hinge pin plate, means to effect independent multi-directional adjustment of said plate horizontally beneath said neck mold, and means independent of the adjusting means for locking said hinge pin plate in any adjusted position.

9. The combination of a neck mold, a finish mold, means for shifting the finish mold in a horizontal plane to align corresponding finish and neck mold cavities, and separate means to lock the mold against accidental movement.

10. The combination of a neck mold, a finish mold, means operable to effect multi-directional adjustment of the finish mold in a horizontal plane relative to the neck mold, and independent mechanical means for rotating the finish mold relative to the neck mold to align corresponding mold cavities.

11. The combination of a neck mold, a finish mold, a finish mold hinge pin plate, means for rotating the plate and finish mold about a vertical axis, separate means for radially adjusting the finish mold and hinge pin plate in a horizontal plane relative to the neck mold, and means for locking said finish mold and hinge pin plate in any adjusted position.

12. The combination of a mold carrier shoe, a guide bar fixed to the shoe, a finish mold hinge pin plate, a plurality of slides interposed between the guide bar and said hinge pin plate, and means operable to effect independent movement of the slides and corresponding independent movement of the hinge pin plate in different directions relative to the mold carrier shoe.

13. The combination of a mold carrier shoe, a guide bar extending across and fixed to said shoe, a slide movable longitudinally upon said guide bar and having a central transverse channel in the upper side, a hinge pin plate holder having a portion movable longitudinally in said channel, means for moving said slide and hinge pin plate holder longitudinally of the guide bar, and separate means for moving said holder transversely of the slide.

14. The combination of a mold carrier shoe, a guide bar extending across and fixed to said shoe, a slide movable longitudinally upon said guide bar and having a central transverse channel in the upper side, a hinge pin plate holder having a portion movable longitudinally in said channel, means for moving said slide and hinge pin plate holder longitudinally of the guide bar, separate means for moving said holder transversely of the slide, and a hinge pin plate carried by said holder.

15. The combination of a mold carrier shoe, a guide bar extending across and fixed to said shoe, a slide movable longitudinally upon said guide bar and having a central transverse channel in the upper side, a hinge pin plate holder having a portion movable longitudinally in said channel, means for moving said slide and hinge pin plate holder longitudinally of the guide bar, separate means for moving said holder transversely of the slide, a hinge pin plate carried by said holder, and means for rotating said hinge pin plate independently of the holder.

16. The combination of a mold carrier shoe, a guide bar extending across and fixed to said shoe, a slide movable longitudinally upon said guide bar and having a central transverse channel in the upper side, a hinge pin plate holder having a portion movable longitudinally in said channel, means for moving said slide and hinge pin plate holder transversely of the slide, a hinge pin plate carried by said holder, means for rotating said hinge pin plate independently of the holder, said rotating means including a head fixed to the lower side of the hinge pin plate, a transverse adjusting screw carried by the hinge pin plate holder beneath said head, and connection between the screw and head whereby rotation of the former moves said hinge pin plate about its vertical axis.

17. The combination of a mold carrier shoe, a guide bar extending across and fixed to said shoe, a slide movable longitudinally upon said guide bar and having a central transverse channel in the upper side, a hinge pin plate holder having a portion movable longitudinally in said channel, means for moving said slide and hinge pin plate holder longitudinally of the guide bar, separate means for moving said holder transversely of the slide, a hinge pin plate carried by said holder, slide and hinge pin plate holder adjusting means comprising relatively right angularly disposed adjusting screws, and swivel connection between said screws and the slide and hinge pin plate holder.

18. The combination of a mold carrier shoe, a guide bar extending across and fixed to said shoe, a slide movable longitudinally upon said bar and having a central transverse channel in its upper side, an adjusting screw threaded through one end of said shoe and swiveled to the adjacent end of said slide, a bracket fixed to one vertical side of said slide, an adjusting screw threaded through said bracket at right angles to the other screw, a hinge pin plate holder having a portion movable longitudinally in said transverse channel, swivel connection between said holder and the second named adjusting screw, and a hinge pin plate carried by the holder.

19. The combination of a mold carrier shoe, a guide bar extending across and fixed to said shoe, a slide movable longitudinally upon said bar and having a central transverse channel in its upper side, an adjusting screw threaded through one end of said shoe and swiveled to the adjacent end of said slide, a bracket fixed to one vertical side of said slide, an adjusting screw threaded through said bracket at right angles to the other screw, a hinge pin plate holder having a portion movable longitudinally in said transverse channel, swivel connection between said holder and the second named adjusting screw, a hinge pin plate carried by the holder, and means for rotating said hinge pin plate independently of its holder.

20. The combination of a mold carrier shoe, a guide bar extending across and fixed to said shoe, a slide movable longitudinally upon said bar and having a central transverse channel in its upper side, an adjusting screw threaded through one end of said shoe and swiveled to the adjacent end of said slide, a bracket fixed to one vertical side of said slide, an adjusting screw threaded through said bracket at right angles to the other screw, a hinge pin plate holder having a portion movable in said transverse channel, swivel connection between said holder and the second named adjusting screw, a hinge pin plate carried by the holder, means for rotating said hinge pin plate independently of its holder, a finish mold bottom plate holder fixed to the hinge pin plate, and a locking bolt interconnecting said guide bar and a bottom plate holder.

21. The combination of a mold carrier shoe, a guide bar extending across and fixed to said shoe, a slide movable longitudinally upon said bar and having a central transverse channel in its upper side, an adjusting screw threaded through one end of said shoe and swiveled to the adjacent end of said slide, a bracket fixed to one vertical side of said slide, an adjusting screw threaded in said bracket at right angles to the other screw, a hinge pin plate holder having a portion movable in said transverse channel, means providing a swivel connection between said holder and the second named adjusting screw, a hinge pin plate carried by the holder, and releasable locking bolts rigidly interconnecting said hinge pin plate holder and shoe to lock the former in any adjusted position.

22. The combination of a mold carrier shoe, a guide bar extending across and fixed to said shoe, a slide movable longitudinally upon said bar and having a central transverse channel in its upper side, an adjusting screw threaded through one end of said shoe and swiveled to the adjacent end of said slide, a bracket fixed to one vertical side of said slide, an adjusting screw threaded through said bracket at right angles to the other screw, a hinge pin plate holder having a portion movable in said transverse channel, means providing a swivel connection between said holder and the second named adjusting screw, a hinge pin plate carried by the holder, means for rotating said hinge pin plate independently of its holder, a finish mold bottom plate holder fixed to the hinge pin plate, a locking bolt interconnecting said guide bar and the bottom plate holder, and releasable means for locking the shoe and hinge pin plate holder together independently of said plate and finish mold bottom plate.

23. The combination of a mold carriage, a mold thereon comprising separable sections, a plate forming a bottom support for the mold sections, a hinge pin carried by said plate and to which the mold sections are pivotally connected, said plate being mounted on the mold carriage for rotative adjustment about the axis of the mold, and a single device operable to rotate the plate about the axis of the mold.

24. The combination of a mold carriage, a mold thereon comprising separable sections, a plate forming a bottom support for the mold sections, a hinge pin carried by said plate and to which the mold sections are pivotally connected, said plate being mounted on the mold carriage for rotative adjustment about the axis of the mold, a single device operable to rotate the plate about the axis of the mold, and means for additionally adjusting said plate transversely of said axis.

25. The combination of a mold carriage, a mold thereon comprising separable sections, a plate forming a bottom support for the mold sections, a hinge pin carried by said plate and to which the mold sections are pivotally connected, said plate being mounted on the mold carriage for rotative adjustment about the axis of the mold, a single device operable to rotate the plate about the axis of the mold, and separate adjusting devices by which said plate may be adjusted in any direction transverse to said axis.

26. The combination of a mold carriage, a mold thereon comprising separable sections, a plate forming a bottom support for the mold sections, a hinge pin carried by said plate and to which the mold sections are pivotally connected, a base on which said plate is mounted for rotative adjustment about the axis of the mold, and means for adjusting said base on the mold carriage.

27. The combination of a mold carriage, a mold thereon comprising separable sections, a plate forming a bottom support for the mold sections, a hinge pin carried by said plate and to which the mold sections are pivotally connected, a base on which said plate is mounted for rotative adjustment about the axis of the mold, means for adjusting said base on the mold carriage in directions at right angles to each other and transversely to the axis of the mold, and means for locking said base and said plate in adjusted position.

Signed at Toledo, in the county of Lucas and State of Ohio, this 27th day of August, 1926.

JOHN E. McLAUGHLIN.